Nov. 29, 1927. 1,650,931
E. G. BUSSE
CAR TRUCK STRUCTURE
Filed May 5, 1927 3 Sheets-Sheet 1
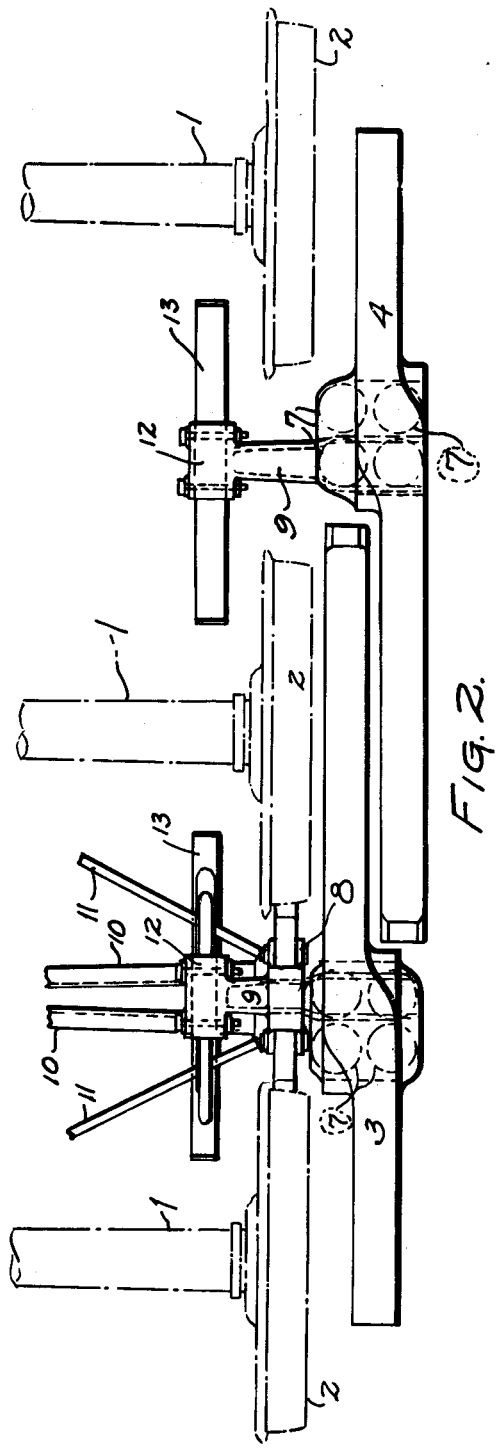
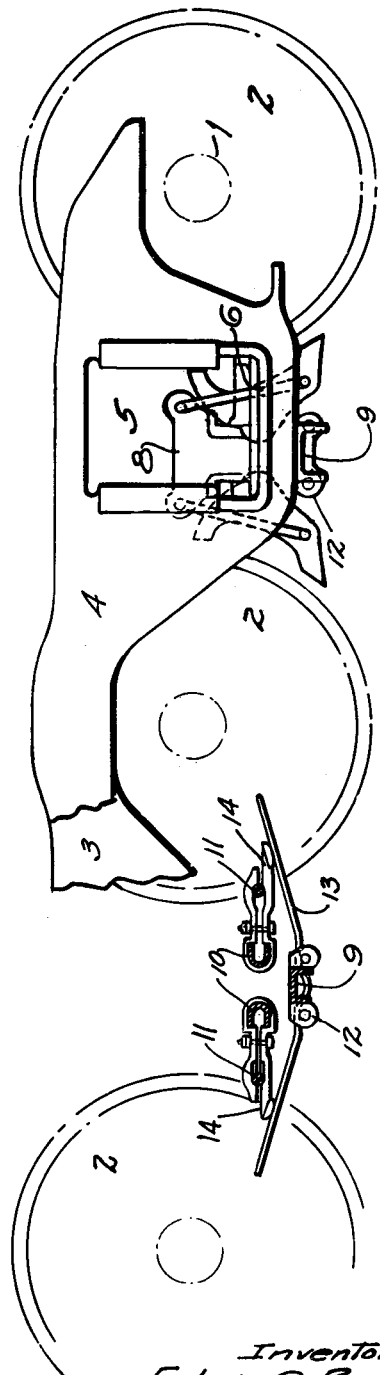
Inventor
Edwin G Busse
By Cornwall, Bedell & James
Attys.

Nov. 29, 1927. 1,650,931
E. G. BUSSE
CAR TRUCK STRUCTURE
Filed May 5, 1927  3 Sheets-Sheet 2

Inventor
Edwin G Busse
By Cornwall, Bodell & James
Attys.

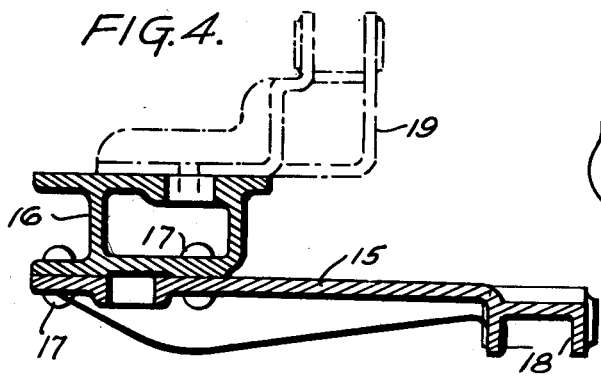
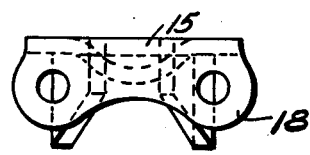
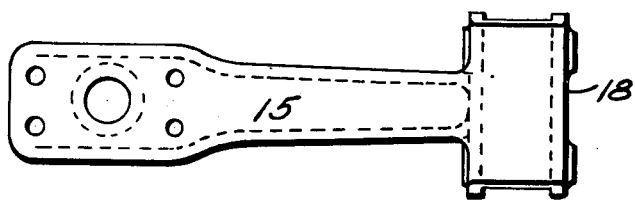
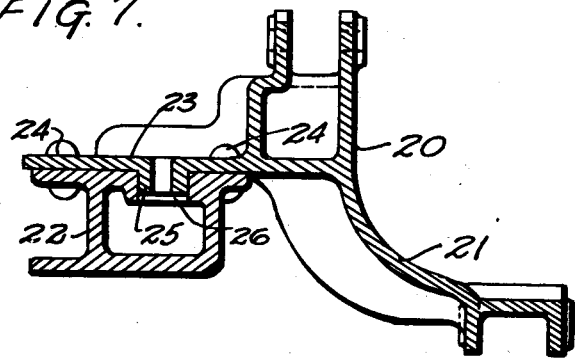

Patented Nov. 29, 1927.

1,650,931

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

CAR-TRUCK STRUCTURE.

Application filed May 5, 1927. Serial No. 188,942.

My invention relates to railway rolling stock and consists in an improved truck frame and brake beam mounting structure.

A comparatively recent development in cars has been the use of trucks without any bottom tie or spring planks, which parts have hitherto been used for mounting brake beam guides, safety guard, and third or fourth point supports. In the absence of the spring plank or corresponding member, some other manner of carrying the parts mentioned for cooperating with the brake beam is desired, and hitherto no successful apparatus has been provided so far as I am aware.

The object of my invention is to provide means on the side frame for carrying a suitable brake beam guide, safety guard, or support.

In the accompanying drawings which illustrate my invention,—

Figure 1 is in part a side elevation and in part a vertical longitudinal section through a six wheel car truck embodying my invention.

Figure 2 is a top view of one longitudinal half of the same truck.

Figure 4 is a section similar to Figure 3 but illustrating a modified form of my invention in which the arm for supporting the brake beam elements is made separately and applied to the side frame.

Figure 5 is a top view of the arm shown in Figure 4.

Figure 6 is an end view of the same.

Figure 7 illustrates another modification of my invention.

Figure 3:
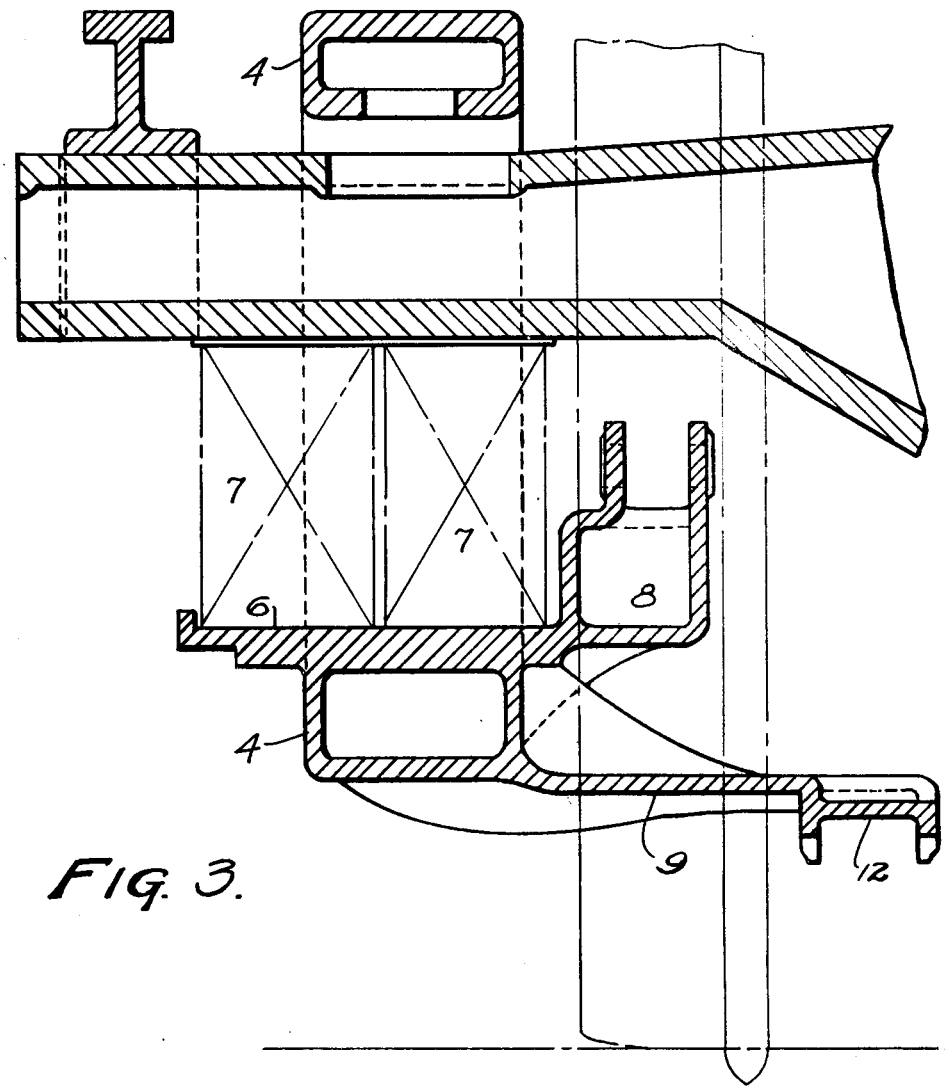
Figure 3 is a vertical transverse section through the side frame taken substantially on line 3—3 of Figure 1.

In the truck shown in Figures 1, 2, and 3 the usual axles and wheels are indicated at 1 and 2, respectively, and it will be understood that the axles are provided with journal boxes upon which the equalizing truck side frame elements 3 and 4 are mounted. The features of these elements aside from those illustrated form no part of my invention.

The side frames are provided with suitable recesses 5 and seats 6 for receiving and mounting the bolster supporting springs 7. Above and inside of each spring seat 4 is a bracket 8 to which the brake hanger may be pivoted in the usual manner.

Below the brake hanger bracket and extending inwardly from the side frame is an arm 9 which is adapted to extend under the level of the brake beams which are here shown as being of the truss type, each having a compression member 10 and a tension member 11. On the inner end of arm 9 are transversely and downwardly extending elements which form a bracket 12 adapted to carry a member 13 which extends longitudinally of the truck and forms a fourth point support or guide for the brake beams. This means may also serve as a safety guard to prevent movement of the brake beam transversely of the truck.

In Figures 1 and 2 I show the brake beams as being equipped with fourth point supports 14 resting upon member 13.

In the preferred embodiment of my invention illustrated in Figures 1, 2, and 3 the side frame, spring seat, brake hanger bracket, and brake beam support arm are formed integrally, and it is believed that such embodiment of my invention is the most economical and will possess adequate strength with the minimum amount of material and also will eliminate the expense of assembling separate parts and the necessity of inspecting and maintaining a separate part structure.

My invention may be embodied in separate parts however, and in Figures 4, 5, and 6 I illustrate a support arm 15 which is formed independently of the side frame, spring seat, and brake hanger bracket and is adapted to be attached to the truck side frame 16 by rivets 17 or otherwise. The inner end of the arm is provided with integral bracket elements 18 corresponding to those provided on the structure shown in Figures 1, 2 and 3. It will be understood that these bracket elements could also be formed separately from the arm and riveted, bolted, or welded thereto. In this form of my invention, the hanger bracket is indicated at 19, but it will be understood that this may be used or not and forms no part of the support arm 15.

In the modification illustrated in Figure 7 the hanger and bracket 20 and the brake beam support arm 21 are formed integrally with each other but separately from the side frame 22 and the laterally projecting flange 23 on the brake bracket and support arm casting is secured to the side frame by rivets 24 and may form the seat for the bolster springs. In this structure, I have shown a boss 25 on the lower side of flange 23 and have provided a corresponding recess 26 in the side frame to receive the boss and assist the rivets 24 in retaining the bracket-arm casting in position.

Obviously other modifications in the details of my invention and in its application to the side frame of the truck may be made without departing from the spirit of my invention, and I contemplate the exclusive use of all such variations as come within the scope of my claims.

I claim:

1. A car truck side frame having an arm extending inwardly therefrom for carrying a brake beam engaging element below the brake beam.

2. A car truck side frame provided with an integrally extending arm adapted to carry a supplemental guard or guide or support for brake beams.

3. In a car truck side frame, a brake beam, and a member carried by said frame and extending transversely of the truck beneath the level of said beam to guard, guide, or support the latter said member terminating adjacent to its beam engageable portion.

4. In a car truck, a side frame, an inwardly extending arm on said frame, and a brake beam engaging member on said arm and extending longitudinally of the truck beneath the level of the brake beam.

5. In a car truck, a side frame, an inwardly extending arm on said frame, and a brake beam guard, guide, or support member detachably mounted on said arm and extending longitudinally of the truck.

6. In a car truck, a side frame, an inwardly extending arm on said frame, and a brake beam guide, guard, or support on said arm and extending longitudinally of the truck on both sides of said arm.

7. In a car truck, a side frame, an inwardly extending arm on said frame, a brake beam guide or guard or support on said arm and extending longitudinally of the truck, and a plurality of brake beams above said arm and adapted to be supported thereby.

8. A car truck side frame having a bolster spring seat and a brake beam guard, guide, or fourth point support formed integrally with said spring seat.

9. A car truck side frame having a bolster spring seat, a brake beam hanger bracket, and a brake beam guard, guide, or fourth point support, all formed integrally with each other.

10. A car truck side frame having an integral brake beam hanger bracket and a member for supporting, guarding, or guiding a brake beam, said member being formed integrally with said bracket.

11. A one-piece casting comprising a truck side frame with an integral brake beam hanger bracket and an integral member for guarding, guiding, or supporting a brake beam.

12. In a car truck, a side frame, an arm extending inwardly from the lower portion of said side frame, and a brake beam support bracket on the inner end of said arm.

13. In a car truck, a side frame, an arm extending inwardly from the lower portion of said side frame, and depending elements on said arm extending transversely thereof and forming a bracket for carrying a brake beam guard, support or guide arm.

14. In a car truck, a side frame, and a member carried solely by said side frame and adapted to guard, guide, or support a brake beam independently of the brake hanger.

15. A car truck device comprising elements for extending inwardly from a side frame to mount a brake beam hanger, and elements extending downwardly and inwardly from said first-mentioned elements to form a supplemental member for engaging a brake beam.

16. A car truck device comprising elements for forming a spring seat, elements extending inwardly and upwardly from said spring seat to form a brake hanger bracket, and elements extending downwardly and inwardly from said bracket to form a supplemental member for engaging a brake beam.

In testimony whereof I hereunto affix my signature this 27th day of April, 1927.

EDWIN G. BUSSE.